United States Patent
Takami et al.

(10) Patent No.: US 11,359,288 B2
(45) Date of Patent: Jun. 14, 2022

(54) CHEMICAL CONVERSION TREATMENT AGENT, METHOD FOR PRODUCING CHEMICAL CONVERSION COATING, METAL MATERIAL HAVING CHEMICAL CONVERSION COATING, AND PAINTED METAL MATERIAL

(71) Applicant: NIHON PARKERIZING CO., LTD., Tokyo (JP)

(72) Inventors: Atsushi Takami, Tokyo (JP); Hidekazu Fukushi, Tokyo (JP)

(73) Assignee: NIHON PARKERIZING CO., LTD., Tokyo (JP)

( * ) Notice: Subject to any disclaimer, the term of this patent is extended or adjusted under 35 U.S.C. 154(b) by 0 days.

(21) Appl. No.: 16/473,700

(22) PCT Filed: Dec. 22, 2017

(86) PCT No.: PCT/JP2017/046066
§ 371 (c)(1),
(2) Date: Jun. 26, 2019

(87) PCT Pub. No.: WO2018/123842
PCT Pub. Date: Jul. 5, 2018

(65) Prior Publication Data
US 2019/0323128 A1    Oct. 24, 2019

(30) Foreign Application Priority Data
Dec. 28, 2016 (JP) .............................. JP2016-254783

(51) Int. Cl.
*C23C 22/34* (2006.01)
*C23C 22/00* (2006.01)

(52) U.S. Cl.
CPC ................................... *C23C 22/34* (2013.01)

(58) Field of Classification Search
CPC .............................. C23C 22/34; C23C 22/361
USPC ........................................................ 148/247
See application file for complete search history.

(56) References Cited

U.S. PATENT DOCUMENTS

| | | | |
|---|---|---|---|
| 6,361,833 B1 | 3/2002 | Nakada et al. | |
| 2004/0244875 A1 | 12/2004 | Yasuda et al. | |
| 2008/0230394 A1 | 9/2008 | Inbe et al. | |
| 2009/0032144 A1 | 2/2009 | McMillen et al. | |
| 2009/0114118 A1 | 5/2009 | Moore | |
| 2012/0145039 A1* | 6/2012 | Silvernail | C23C 22/86 106/287.19 |
| 2016/0040298 A1 | 2/2016 | Mizuno et al. | |

FOREIGN PATENT DOCUMENTS

| | | | |
|---|---|---|---|
| CN | 1493712 A | 5/2004 | |
| CN | 101663420 A | 3/2010 | |
| CN | 104145045 A | 11/2014 | |
| EP | 930379 A1 | 7/1999 | |
| EP | 1433875 A1 | 6/2004 | |
| EP | 1433876 A1 | 6/2004 | |
| EP | 1433877 A1 | 6/2004 | |
| EP | 1433878 A1 | 6/2004 | |
| JP | H11264076 A | 9/1999 | |
| JP | 2000199077 A | 7/2000 | |
| JP | 2002332575 A | 11/2002 | |
| JP | 2004149896 A | 5/2004 | |
| JP | 2004218073 A | 8/2004 | |
| JP | 2011-105989 | * 6/2011 | ............. C23C 22/34 |
| KR | 10-20040038635 A | 5/2004 | |

OTHER PUBLICATIONS

International Search Report issued in International Application No. PCT/JP2017/046066; dated Feb. 13, 2018 (3 pages).
Written Opinion of the International Searching Authority issued in International Application No. PCT/JP2017/046066; dated Feb. 13, 2018 (3 pages).
International Preliminary Report on Patentability issued in corresponding International Application No. PCT/JP2017/046066; dated Jul. 11, 2019 (5 pages).
Office Action issued in corresponding Chinese Application No. 201780080551.5, dated Aug. 28, 2020 (5 pages).
Office Action issued in corresponding Indian Application No. 201917024299; dated Jun. 22, 2020 (6 pages).
Extended European Search Report issued in corresponding European Application No. 17888146.2; dated Jun. 30, 2020 (8 pages).

* cited by examiner

*Primary Examiner* — Lois L Zheng
(74) *Attorney, Agent, or Firm* — Osha Bergman Watanabe & Burton LLP

(57) ABSTRACT

Provided are a novel chemical conversion treatment agent which is capable of forming, on/over the surface of a metal material, a chemical conversion coating which is superior in corrosion resistance, a method for producing a chemical conversion coating on/over the surface of a metal material with the use of the chemical conversion treatment agent, a metal material having a coating, and a painted metal material.

The problem mentioned above can be solved by the chemical conversion treatment agent for forming a coating on/over the surface of a metal material, which characterized by containing: an ion containging at least one metal selected from the group consisting of titanium, zirconium and hafnium; a fluorine ion; at least one selected from the group consisting of an alkanesulfonic acid, an alkanolsulfonic acid, and ions thereof; and an ion containing trivalent iron.

6 Claims, No Drawings

CHEMICAL CONVERSION TREATMENT AGENT, METHOD FOR PRODUCING CHEMICAL CONVERSION COATING, METAL MATERIAL HAVING CHEMICAL CONVERSION COATING, AND PAINTED METAL MATERIAL

TECHNICAL FIELD

The present invention relates to a chemical conversion treatment agent for forming a chemical conversion coating on/over the surface of a metal material, a method for producing a chemical conversion coating on/over the surface of a metal material with the use of the chemical conversion treatment agent, a metal material having a chemical conversion coating, and a painted metal material.

BACKGROUND ART

Chemical conversion treatment for the purpose of imparting corrosion resistance to metal materials has been carried out from a long time ago. The chemical conversion treatment refers to bringing a metal material into contact with a chemical referred to as a chemical conversion treatment agent to form a chemical conversion coating on/over the surface of the metal material. As a common chemical conversion treatment, for example, a zirconium chemical conversion treatment, a titanium chemical conversion treatment, a hafnium chemical conversion treatment, a vanadium chemical conversion treatment, and the like are known, as described in Patent Literatures 1 and 2 and the like.

CITATION LIST

Patent Literature

Patent Literature 1: JP 2000-199077 A
Patent Literature 2: JP 2004-218073 A

SUMMARY OF INVENTION

Technical Problem

An object of the present invention is to provide a novel chemical conversion treatment agent which is capable of forming, on/over the surface of a metal material, a chemical conversion coating which is superior in corrosion resistance, a method for producing a chemical conversion coating on/over the surface of a metal material with the use of the chemical conversion treatment agent, a metal material having a chemical conversion coating, and a painted metal material.

The inventors have found, as a result of further earnest studies for solving the problem mentioned above, that a chemical conversion treatment agent containing:

an ion containing at least one metal selected from the group consisting of titanium, zirconium and hafnium;
a fluorine ion;
at least one selected from the group consisting of an alkanesulfonic acid, an alkanolsulfonic acid, and ions thereof; and
an ion containing trivalent iron
is capable of forming a chemical conversion coating which is superior in corrosion resistance, thereby achieving the present invention.

Solution to Problem

Here are the means for solving the problem.
[1] A chemical conversion treatment agent for a metal material, for forming a chemical conversion coating on/over the surface of a metal material, the chemical conversion treatment agent containing:
an ion containing at least one metal selected from the group consisting of titanium, zirconium and hafnium;
a fluorine ion;
at least one selected from the group consisting of an alkanesulfonic acid, an alkanolsulfonic acid, and ions thereof; and
an ion containing trivalent iron.
[2] The chemical conversion treatment agent according to [1], containing an ion containing at least one metal selected from the group consisting of aluminum, magnesium, and zinc.
[3] The chemical conversion treatment agent according to [1] or [2], containing at least one selected from water-soluble resins and water-dispersible resins,
[4] A method for producing a Chemical conversion coating on/over the surface of a metal material, the method including a contact step of bringing the chemical conversion treatment agent according to any of [1] to [3] into contact with the surface.
[5] The method according to [4], further including a painting step of carrying out painting on/over the surface which was subjected to contact with the chemical conversion treatment agent.
[6] A metal material having a chemical conversion coating, including: a metal material; and a chemical conversion coating formed by bringing the chemical conversion treatment agent according to any of [1] to [3] into contact with the surface of the metal material.
[7] A painted metal material including: a metal material; a chemical conversion coating formed by bringing the chemical conversion treatment agent according to any of [1] to [3] into contact with the surface of the metal material; and a paint film containing a paint composition on/over the surface of the chemical conversion coating.

Advantageous Effects of Invention

According to the present invention, regardless of the type of the target metal material, it is possible to provide a novel chemical conversion treatment agent which is capable of forming, on/over the surface of a metal material, a chemical conversion coating which is superior in corrosion resistance, a method for producing a chemical conversion coating on/over the surface of a metal material with the use of the chemical conversion treatment agent, a metal material having a chemical conversion coating, and a painted metal material.

DESCRIPTION OF EMBODIMENTS

The chemical conversion treatment agent according to the present invention is a chemical conversion treatment agent containing:
an ion containing at least one metal selected from the group consisting of titanium, zirconium and hafnium;
a fluorine ion;
at least one selected from the group consisting of an alkanesulfonic acid, an alkanolsulfonic acid, and ions thereof; and
an ion containing trivalent iron. The chemical conversion treatment agent components, properties such as liquid properties), a method for producing the chemical conversion treatment agent, a method of using the chemical conversion treatment agent, and the like will be described below in order.

I. Chemical Conversion Treatment Agent (1) Components (Ion Containing at Least One Metal Selected from the Group Consisting of Titanium, Zirconium, and Hafnium)

The ion containing at least one metal selected from the group consisting of titanium, zirconium, and hafnium is not particularly limited, and examples thereof can include for example, metal ions such as a titanium ion, a zirconium ion, and a hafnium ion, complex ions containing titanium, zirconium, or hafnium, and oxide ions of titanium, zirconium, or hafnium. One of, or two or more of the ions can be used for the chemical conversion treatment agent according to the present invention.

(Fluorine Ion)

The chemical conversion treatment agent according to the present invention has both fluorine ions present as being coordinated or bound to each metal ion of titanium, zirconium, and hafnium (furthermore, aluminum, magnesium and zinc optionally added), and fluorine ions present (free) as $F^{-1}$ (monovalent fluorine) in the chemical conversion treatment agent without being coordinated or bound to the metal ion. In the present invention, the former fluorine ions are part of "ions containing at least one metal selected from the group consisting of titanium, zirconium, and hafnium" (and optionally added "ions containing at least one metal selected from the group consisting of aluminum, magnesium, and zinc") according to the present invention, which are not considered corresponding to the "fluorine ion" according to the present invention, and only the latter fluorine ions are regarded as "fluorine ions" according to the present invention (hereinafter, also referred to as "free fluorine ions"). From another point of view, the foregoing can be explained as follows. In the present invention, the phrase of "containing a fluorine ion (containing a free fluorine ion)" means that the value $(M_F - M_F')$ exceeds 0, where the value is obtained by subtracting the total fluorine equivalent mass $M_F'$ of all fluoride ions included in "ions containing at least one metal selected from the group consisting of titanium, zirconium and hafnium" (and all fluorine ions included in optionally added "ions containing at least one metal selected from the group consisting of aluminum, magnesium, and zinc"), from the total fluorine equivalent mass $M_F$ of respective fluorine ions calculated from the blending amounts of respective compounds blended in the chemical conversion treatment agent. $M_F'$ is a value calculated by multiplying, by the fluorine atomic weight 19, the sum $(n_{Zr} \times m_{Zr} + n_{Ti} \times m_{Ti} + n_{Hf} \times m_{Hf} + n_{Al} \times m_{Al} + n_{Mg} \times m_{Mg} + n_{Zn} \times m_{Zn})$ of values obtained by multiplying, by the numbers of fluorine ions coordinated or bound to the respective metal ions (the number $n_{Zr}$ of fluorine ions coordinated to the zirconium ion, etc.), the mole numbers of the respective metals (zirconium mole number $m_{Zr}$, titanium mole number $m_{Ti}$, hafnium mole number $m_{Hf}$, aluminum mole number $m_{Al}$, magnesium mole number $m_{Mg}$, zinc mole number $m_{Zn}$) calculated by dividing, by the atomic weights of the respective metals, the metal equivalent mass of respective metal ions to which a fluorine ion is coordinated or bound, which are "ions containing metals of titanium, zirconium, and/or hafnium" (and optionally added ions containing metals of aluminum, magnesium, and/or zinc) included in the chemical conversion treatment agent (the total metal equivalent mass of the respective metals, calculated from the blending amounts of respective compounds blended in the chemical conversion treatment agent). More specifically, in the present invention, the phrase of "containing a fluorine ion" means that $\{M_F - (n_{Zr} \times m_{Zr} + n_{Ti} \times m_{Ti} + n_{Hf} \times m_{Hf} + n_{Al} \times m_{Al} + n_{Mg} \times m_{Mg} + n_{Zn} \times m_{Zn}) \times 19\}$ exceeds 0.

(Ion of Alkanesulfonic Acid or Alkanolsulfonic Acid)

The ion of alkanesulfonic acid or alkanolsulfonic acid is, for example, $R-SO_3^-$ (where R is an alkyl group or a hydroxyalkyl group). The alkyl group is not to be considered particularly limited, but preferably a $C_{1-20}$ alkyl group, more preferably a $C_{1-4}$ alkyl group. The alkanesulfonic acid ion is not to be considered particularly limited, but examples thereof include, for example, a methanesulfonic acid ion, an ethanesulfonic acid ion and the like. The alkanol sulfonic ion is not to be considered particularly limited, but examples thereof include, for example, an isethionic acid ion and the like. One of, or two or more of the acids and ions can be used for the chemical conversion treatment agent according to the present invention.

(Ion Containing Trivalent Iron)

The ion containing trivalent iron is not particularly limited, and examples thereof can include, for example, trivalent iron ions, complex ions containing trivalent irons and the like. One of, or two or more of the ions can be used for the chemical conversion treatment agent according to the present invention.

(Ion Containing Divalent Iron)

The chemical conversion treatment agent according to the present invention may further contain an ion containing a divalent iron, besides the components mentioned above. The ion containing divalent iron is not particularly limited, and examples thereof can include, for example, divalent iron ions, complex ions containing divalent irons and the like. One of, or two or more of the ions can be used for the chemical conversion treatment agent according to the present invention. The ratio between the iron equivalent mass concentration in the ion containing divalent iron ($Fe^{2+}$, a complex ion containing $Fe^{2+}$, or the like) and the iron equivalent mass concentration in the ion containing trivalent iron ($Fe^{3+}$, a complex ion containing $Fe^{3+}$, or the like) (hereinafter, represented as "$Fe^{2+}/Fe^{3+}$" in this specification) is not to be considered particularly limited, but in a preferred order, 1.6 or less, 1.2 or less, 0.6 or less, 0.45 or less, 0.3 or less, 0.2 or less. The ratio is most preferably is 0.2 or less (0.0 or more and 0.2 or less). It is to be noted that the value of the $Fe^{2+}/Fe^{3+}$ mentioned above is a calculated value by measuring the respective iron equivalent mass concentrations of $Fe^{2+}$ and $Fe^{3+}$ by a chelate titration method with the use of EDTA under the conditions of temperature 25° C. and pH=1.5. The chelate titration method will be described in detail in the examples.

(Ion Containing at Least One Metal Selected from the Group Consisting of Aluminum, Magnesium, and Zinc)

The chemical conversion treatment agent according to the present invention may further contain an ion containing at least one metal selected from the group consisting of aluminum, magnesium, and zinc. The ion containing at least one metal selected from the group consisting of aluminum, magnesium, and zinc is not to be considered particularly limited, but examples thereof can include, for example, metal ions such as an aluminum ion, a magnesium ion, a zinc ion and the like, and complex ions containing aluminum, magnesium or zinc, and the like. It is to be noted that one of, or two or more of the ions can be used for the chemical conversion treatment agent according to the present invention. The combination of two or more thereof is not to be considered particularly limited, but examples of the combination can include, for example, an ion containing aluminum and an ion containing zinc.

(Water-Soluble Resin and Water-Dispersible Resin)

The chemical conversion treatment agent according to the present invention may further contain at least one selected from water-soluble resins and water-dispersible resins. The chemical conversion treatment agent according to the present invention preferably further contains a water-soluble resin and a water-dispersible resin, because the corrosion resistance of a chemical conversion coating formed with the chemical conversion treatment agent can be further improved. It is to be noted that in the present invention, the "water-soluble resin and water-dispersible resin" means a water-soluble resin and a water-dispersible resin which are dissolved or dispersed in an amount of 1 mg or more as a solid content equivalent mass in 1 kg of water at 25° C. The water-soluble resin and the water-dispersible resin are not to be considered particularly limited, but preferably an organic compound that has a repeated structure with a molecular weight of more than 500. The water-soluble resin and the water-dispersible resin which can be used in the present invention is not to be considered particularly limited, but examples thereof can include, for example, polyvinyl alcohol, polyallylamine, urethane resins, phenol resins, novolac resins, polyethyleneimine, polydiallylamine, polyvinyl acetate, epoxy resins and the like. It is to be noted that one of, or two or more of the resins can be used for the chemical conversion treatment agent according to the present invention.

(Surfactant)

The chemical conversion treatment agent according to the present invention may further contain at least one surfactant. The ionicity of the surfactant may be nonionic, cationic, anionic, or amphoteric. The nonionic surfactant is not to be considered particularly limited, but the examples thereof include, for example, polyethylene glycol-type nonionic surfactants such as polyoxyethylene alkyl phenyl ether, polyoxyethylene alkyl ether, polyoxyethylene fatty acid esters, polyoxyethylene sorbitan fatty acid esters, polyoxyethylene-polyoxypropylene block polymers and the like, polyhydric alcohol-type nonionic surfactants such as sorbitan fatty acid esters and the like, amide-type nonionic surfactants such as fatty acid alkylol amide and the like, and so on. The cationic surfactant is not to be considered particularly limited, but examples thereof include, for example, amine salt-type cationic surfactants such as higher alkylamine salts, polyoxyethylene higher alkylamines and the like, quaternary ammonium salt-type cationic surfactants such as alkyltrimethyl ammonium salts and the like, and so on. The anionic surfactant is not to be considered particularly limited, but examples thereof include, for example, higher alkyl ether sulfuric acid ester salts to which ethylene oxide is added, and the like. It is to be noted that the HLB value calculated by the Griffin method) of the surfactant is not to be considered particularly limited, but preferably 6 or more and 18 or less, and more preferably 10 or more and 14 or less. It is to be noted that one of, or two or more of the surfactants mentioned above can be used for the chemical conversion treatment agent according to the present invention. The above-mentioned surfactant is included in the chemical conversion treatment agent according to the present invention, thereby making it possible to perform a one-step treatment, which can simultaneously perform a chemical conversion treatment and a degreasing treatment.

The chemical conversion treatment agent according to the present invention may further contain other additives (for example, compounds having an organosilane as a main chain, and the like) conventionally known as additives for chemical conversion treatment agents, as long as the advantageous effect of the present invention is not impaired.

(2) Properties of Chemical Conversion Treatment Agent According to Present invention (pH)

The pH of the chemical conversion treatment agent according to the present invention is not to be considered particularly limited, but preferably 1.0 or more and 7.0 or less, and more preferably 3.0 or more and 5.5 or less. When the pH falls within the foregoing range, a coating can be formed which has better corrosion resistance. In this regard, the pH in this specification has a value measured for the chemical conversion treatment agent at 25° C. with the use of a pH meter. A pH adjusting agent may be used to bring the pH of the chemical conversion treatment agent according to the present invention into the previously mentioned range. The pH adjusting agent which can be used to desire an increase in pH is not to be considered particularly limited, but, for example, preferably an aqueous solution of sodium hydroxide, an aqueous solution of potassium hydroxide, aqueous ammonia, and the like. On the other hand, the chemical conversion treatment agent according to the present invention contains an alkanesulfonic acid or the like as an essential component, and thus, in the case of desiring a decrease in pH, the blending amount of the acid is preferably adjusted to decrease the pH into a predetermined pH range. Other acids (for example, inorganic acids such as sulfuric acid, nitric acid and the like) may be, however, used as long as the advantageous effect of the present invention is not impaired. It is to be noted that one of, or two or more of the pH adjusting agents can be used.

(Environmental Load Component-Free and/or Environmental Load Component-Less)

The chemical conversion treatment agent according to the present invention can be used as a chemical conversion treatment agent of environmental load components-free and/or environmental load components-less, and in such a case, the agent can contribute to the improvement of environmental conservation (safety) and the improvement of wastewater treatment. In this regard, the term of environmental load component-less means that elements (for example, nitrogen, phosphorus, boron, nickel, chromium, etc.) that cause environmental loads are not included in the chemical conversion treatment agent and/or only small amounts of elements that cause environmental loads are included in the chemical conversion treatment agent. Specifically, the term of environmental load components-free means that each element is less than the detection limit of the element, in ICP emission spectrometry in the case of phosphorus, boron, nickel, and chromium, and in total nitrogen concentration analysis in the case of nitrogen. In addition, the term of environmental load components-less means that the mass concentration of elements that cause environmental loads, that is, phosphorus, boron, nickel, chromium, and the like is a mass concentration which slightly exceeds the quantitatively measurable lower limit value of each element in ICP emission spectrometry, and means that the mass concentration of an element that causes an environmental load, that is, nitrogen, is a mass concentration which is about 50 times as high as the quantitatively measurable lower limit value of nitrogen in total nitrogen concentration analysis.

(Sludge-Less)

The chemical conversion treatment agent according to the present invention can also be used as a chemical conversion treatment agent which is sludge-less. In this regard, the sludge means the metal component eluted into the chemical conversion treatment agent, which is precipitated in the chemical conversion treatment agent in the form of hydroxide or oxide during the chemical conversion treatment of the metal material. The amount of sludge can be reduced by increasing the mass concentration of at least one acid selected from the alkanesulfonic acid and the alkanolsulfonic acid in the chemical conversion treatment agent. Specifically, it is preferable to include at least one acid selected from the alkanesulfonic acid and the alkanolsulfonic acid, which has a molar concentration corresponding to three or more times the molar concentration of the metal component eluted from the metal material.

2. Method for Producing Chemical Conversion Treatment Agent (1) Method

The chemical conversion treatment agent according to the present invention is prepared as a liquid. The production method thereof is not to be considered particularly limited, but can be produced by, for example, combining, in a liquid medium, an ion source containing at least one metal selected from the group consisting of titanium, zirconium and hafnium, a fluorine ion source, at least one source selected from the group consisting of an alkanesulfonic acid, an alkanolsulfonic acid, and ions thereof, and a trivalent iron ion source, if necessary, an ion source containing the other metal and/or optional components such as the water-soluble resin and the like may be combined. Moreover, for the production of the chemical conversion treatment agent according to the present invention, a compound containing one, or two or more elements may be used which serves as the ion source for at least one selected from the group consisting of titanium, zirconium, and hafnium. For example, a compound or the like, which contains at least one metal element selected from titanium, zirconium, and hafnium and a fluorine element as constituent elements, can also be used as a component source. The liquid medium is not to be particularly limited, but preferably water (deionized water, distilled water). In addition, as the liquid medium, a mixed solvent in which a hydrophilic solvent (for example, a lower alcohol) is mixed with water may be used as long as the source is soluble.

(2) Component Sources and Blending Amounts of Various Ions (Component Source of Ion Containing at Least One Metal Selected from the Group Consisting of Titanium, Zirconium, and Hafnium)

The ion source containing at least one metal selected from the group consisting of titanium, zirconium, and hafnium is not particularly limited, which can be used for the preparation of the chemical conversion treatment agent according to the present invention, and ion sources containing titanium, zirconium, or hafnium can be used. Compounds containing two or more of these sources can also be used as the component source. Examples of the component source include sources that can form a titanium ion, a zirconium ion, or a hafnium ion, a complex ion of the metal, or an oxide ion thereof in the chemical conversion treatment agent, such as fluoroditanum acid, titanium nitrate, titanyl nitrate, titanium hydroxide, titanium oxide, fluorozirconium acid, zirconium nitrate, zirconyl nitrate, potassium zirconium carbonate, zirconium ammonium carbonate, zirconium hydroxide, zirconium oxide, fluorohafnium acid, hafnium nitrate, and hafnium oxide, and the like. It is to be noted that one of, or two or more of the component sources can be used.

(Blending Amount of Component Source of Ion Containing at Least One Metal Selected from the Group Consisting of Titanium, Zirconium, and Hafnium)

The blending amount of the compound(s), which serves as a component source of the ion containing at least one metal selected from the group consisting of titanium, zirconium, and h_hafinum, is not to be considered particularly limited, but preferably, as the total metal equivalent mass of the compound(s), falls within the range of 5 mg/kg or more and 2000 mg/kg or less, and more preferably within the range of 10 mg/kg or more and 1000 mg/kg or less.

(Component Source of Fluorine Ion)

Examples of the component source of fluorine ion include hydrofluoric acid, lithium fluoride, sodium fluoride, potassium fluoride, calcium fluoride, and fluorosilicic acid, and the like. It is to be noted that one of, or two or more of the component sources can be used.

(Blending Amount of Component Source of Fluorine Ion)

The blending amount of the compound which serves as a component source of fluorine ion is not to be considered particularly limited as long as the amount of the chemical conversion treatment agent according to the present invention can be considered "containing a fluorine ion". For example, in a case where the number of fluorine ions coordinated to at least one metal selected from the group consisting of titanium, zirconium, and hafnium is 4, a compound is blended which serves as a component source of fluoride ion more than 4 times as large in fluorine equivalent mass as the total metal equivalent mass of titanium, zirconium, and hafnium. On the other hand, in a case where the number of fluorine ions coordinated to at least one metal selected from the group consisting of titanium, zirconium, and hafnium is 6, a compound is blended which serves as a component source of fluoride ion more than 6 times as large in fluorine equivalent mass as the total metal equivalent mass of titanium, zirconium, and hafnium.

(Source of at Least one Selected form Alkanesulfonic Acid, Alkanolsulfonic Acid, and Ions Thereof)

As the at least one source selected from alkanesulfonic acid, alkanolsulfonic acid, and ions thereof, in a case where these acids are water-soluble, the acids may be used directly, or in a case where the acids are poorly soluble or insoluble in water, water-soluble salts {cationic counter ions that forms the salts are not to be considered particularly limited, but examples thereof can include metal ions such as alkali metal (sodium, potassium, lithium, and the like) ions, alkaline earth metal (magnesium, calcium, barium, and the like) ions, and ammonium ions and so on} may be used. The source of at least one selected from alkanesulfonic acid, alkanolsulfonic acid, and ions thereof is not to be considered particularly limited, but examples thereof include methanesulfonic acid, ethanesulfonic acid, propanesulfonic acid, butanesulfonic acid, isethionic acid, and the like, or salts thereof. It is to be noted that one of, or two or more of the component sources can be used.

(Blending Amount of Alkanesulfonic Acid or Salt Thereof and/or Alkanolsulfonic Acid or Salt Thereof)

The blending amount of the alkanesulfonic acid or salt thereof and/or the alkanolsulfonic acid or salt thereof is not to be considered particularly limited, as long as the amount can be considered "containing ions of the alkanesulfonic acid or the alkanolsulfonic acid" in the chemical conversion treatment agent according to the present invention. For example, an alkanesulfonic acid or a salt thereof and/or an alkanolsulfonic acid or a salt thereof is blended which is more than 3 times as large in sulfur trioxide ($SO_3$) equivalent mass, corresponding to the sulfonate ion of alkanesulfonic acid and/or alkanolsulfonic acid, as the iron equivalent mass in ion containing trivalent iron. In addition, the chemical conversion treatment agent according to the present invention may further contain an ion containing divalent iron, and in such a case, an alkanesulfonic acid or a salt thereof and/or an alkanolsulfonic acid or a salt thereof is blended which is more than twice as large in sulfur trioxide ($SO_3$) equivalent mass, corresponding to the sulfonate ion of alkanesulfonic acid and/or alkanolsulfonic acid, as the iron equivalent mass in ion containing divalent iron.

(Component Sources of Ion Containing Trivalent Iron)

The component source of the ion containing trivalent iron is not to be considered particularly limited as long as the source serves as an ion containing trivalent iron in the chemical conversion treatment agent, and examples of the source include, for example, iron (III) nitrate, iron (III) sulfate, and iron (III) chloride. It is to be noted that one of, or two or more of the component sources can be used.

(Blending Amount of Component Source of Ion containing Trivalent Iron)

The blending amount of a compound which is the component source of the ion containing trivalent iron is not to be considered particularly limited, but preferably falls within the range of 5 mg/kg or more and 2000 mg/kg or less, more preferably, within the range of 10 mg/kg or more and 1500 mg/kg or less, and even more preferably within the range of 10 mg/kg or more and 1000 mg/kg or less in iron equivalent mass.

(Component Source of Ion Containing Divalent Iron and Blending Amount Thereof)

The chemical conversion treatment agent according to the present invention may further contain an ion containing a divalent iron. The component source of the ion containing divalent iron is not to be considered particularly limited as long as the source serves as an ion containing divalent iron in the chemical conversion treatment agent, and examples of the source include, for example, iron (II) nitrate, iron (II) sulfate, iron (II) chloride, and the like. It is to be noted that one of, or two or more of the component sources can be used. It is preferable to blend a compound which is the component source of the ion containing divalent iron such that the $Fe^{2+}/Fe^{3+}$ mentioned above falls within the preferred range.

(Component Source of Ion Containing Aluminum and Blending Amount Thereof)

Examples of the component source of the ion containing aluminum include, for example, aluminum hydroxide, aluminum nitrate, aluminum sulfate, and the like. One of, or two or more of the component sources can be used. The blending amount of a compound which is the component source of the ion containing aluminum is not to be considered particularly limited, but preferably falls within the range of 5 mg/kg or more and 1000 mg/kg or less, more preferably, within the range of 10 mg/kg or more and 500 mg/kg or less in aluminum equivalent mass. It is to be noted in the case of blending a compound which serves as the component source of the ion containing aluminum with the chemical conversion treatment agent according to the present invention, for example, a fluorine ion component source is further blended which is more than 3 times as large in fluorine equivalent mass as the aluminum equivalent mass of the compound.

(Component Source of Ion Containing Zinc and Blending Amount Thereof)

Examples of the component source of the ion containing zinc include, for example, zinc oxide, zinc hydroxide, zinc sulfate, zinc nitrate, and the like. One of, or two or more of the component sources can be used. The blending amount of a compound which is the component source of the ion containing zinc is not to be considered particularly limited, but preferably falls within the range of 5 mg/kg or more and 5000 mg/kg or less, more preferably, within the range of 100 mg/kg or more and 3000 mg/kg or less in zinc equivalent mass. It is to be noted in the case of blending a compound which serves as the component source of the ion containing zinc with the chemical conversion treatment agent according to the present invention, for example, a fluorine ion component source is blended which is more than twice as large in fluorine equivalent mass as the zinc equivalent mass of the compound, or an alkanesulfonic acid or a salt thereof, and/or an alkanolsulfonic acid or a salt thereof is blended which is more than twice as large in sulfur trioxide ($SO_3$) equivalent mass as sulfur trioxide ($SO_3$). Further, sulfuric acid may be used instead of the fluorine ion component source, the alkanesulfonic acid, the alkanolsulfonic acid, or the like.

(Component Source of Ion containing Magnesium and Blending Amount Thereof)

Examples of the component source of the ion containing magnesium include, for example, magnesium nitrate, magnesium hydroxide, magnesium oxide, magnesium chloride, magnesium sulfate, and the like. One of, or two or more of the component sources can be used. The blending amount of a compound which is the component source of the ion containing magnesium is not to be considered particularly limited, but preferably falls within the range of 10 mg/kg or more and 20000 mg/kg or less, more preferably, within the range of 100 mg/kg or more and 10000 mg/kg or less in magnesium equivalent mass. It is to be noted in the case of blending a compound which serves as the component source of the ion containing magnesium into the chemical conversion treatment agent according to the present invention, for example, a fluorine ion component source is blended which is more than twice as large in fluorine equivalent mass as the magnesium equivalent mass of the compound, or an alkanesulfonic acid or a salt thereof, and/or an alkanolsulfonic acid or a salt thereof is blended Which is more than twice as large in sulfur trioxide ($SO_3$) equivalent mass as the magnesium equivalent mass of the compound. Further, sulfuric acid may be used instead of the fluorine ion component source, the alkanesulfonic acid, the alkanolsulfonic acid, or the like.

(Blending Amount of Water-Soluble Resin and Water-Dispersible Resin)

The mass concentration of the water-soluble resin and water-dispersible resin in the chemical conversion treatment agent according to the present invention can be measured by a common method, and measured, for example, by carrying out gel filtration chromatography. The mass concentration of the water-soluble resin and the water-dispersible resin according to the present invention is not to be considered particularly limited, but preferably 5 mg/kg to 3000 mg/kg, more preferably 10 to 1000 mg/kg as a solid content equivalent mass concentration.

(Blending Amount of Surfactant)

In addition, the mass concentration of the surfactant in the chemical conversion treatment agent according to the present invention can also be measured in the same manner as the mass concentration of the water-soluble resin or the like. The mass concentration of the surfactant is no to be considered particularly limited, but preferably 10 mg/kg to 3000 mg/kg.

Further, when the chemical conversion treatment agent according to the present invention is continuously used to a predetermined metal material, the ion containing at least one metal selected from the group consisting of aluminum, magnesium, and zinc may be accumulated in the chemical conversion treatment agent by the elution of the material, even if the ion is not intentionally added, and this aspect is also included in the aspects further containing ions containing these metals.

In addition, examples of the other component which can be optionally blended are the same as the compounds exemplified as optional components for the chemical conversion treatment agent.

3. Use of Chemical Conversion Treatment Agent (Method for Producing Chemical Conversion Coating on/over Surface of Metal Material)

(1) Application Target

The present invention also relates to a method for producing a chemical conversion coating on/over the surface of a metal material with the use of the chemical conversion treatment agent according to the present invention. There is no limitation on the types of metal materials that can be used as the target to be processed. Examples thereof include iron (that is, cold-rolled steel, hot-rolled steel, high-tensile steel, tool steel, alloy tool steel, spheroidized graphite cast iron, gray cast iron, etc.), plating materials, for example, galvanized materials (for example, electrogalvanizing, hot-dip galvanizing, alloying hot-dip galvanizing, zinc alloy electroplating, etc.), aluminum materials (for example, 1000 series, 2000 series, 3000 series, 4000 series, 5000 series, 6000 series, aluminum castings, aluminum alloy castings, die-casting materials, etc.), and magnesium materials.

(2) Contact Step

The method includes a contact step of bringing the chemical conversion treatment agent according to the present invention into contact with the surface of the metal material. Thus, a chemical conversion coating is formed on/over the surface of the metal material. Examples of the contact method include, for example, an immersion processing method, or processing methods performed without flowing any electric current, such as a spray processing method, a pouring processing method, and the like.

The temperature of contact between the metal material and the chemical conversion treatment agent is preferably 10° C. or higher and lower than 60° C., and more preferably 20° C. or higher and lower than 50° C. but not to be considered limited to the foregoing temperatures. In addition, the time periods of contact between the metal material and the chemical conversion treatment agent is preferably 30 to 300 seconds, more preferably 60 to 180 seconds, but not to be considered limited to the foregoing processing time periods.

(3) Optional Step (Post-Step)

As a surface treatment method according to the present invention, other steps may be further carried out after the coating is formed in the contact step (hereinafter, referred to as "the contact step according to the present invention"). For example, the other steps include an alkaline cleaning step, a water washing step, a chromate chemical conversion treatment, a zinc phosphate chemical conversion treatment step, a bismuth displacement plating step, phosphorus-iron chemical conversion treatment step, a zirconium chemical conversion treatment step, a titanium chemical conversion treatment step, a hafnium chemical conversion treatment step, a drying process, and the like. In addition, two or more steps of the various post-steps mentioned above may be sequentially carried out in combination as a post-step. The zirconium chemical conversion treatment step carried out as the post-step may be a step of contact with the chemical conversion treatment agent according to the present invention (the composition thereof may be the same as or different from the chemical conversion treatment agent used in the above-mentioned contact step), or may be a step of contact with a chemical conversion treatment agent that is different from the chemical conversion treatment agent according to the present invention. Further, in the case of combining the various post-steps mentioned above, water rinsing may be optionally carried out after the various post-steps, or the water rinsing may be partially omitted.

(Pre-Step)

Moreover, as a surface treatment method according to the present invention, a pre-step may be carried out before the contact step according to the present invention. Examples of the pre-step include, for example, an acid cleaning step, a degreasing step, an alkaline cleaning step, a chromate chemical conversion treatment step, a phosphate chemical conversion treatment step with the use of zinc phosphate, iron phosphate, or the like, a bismuth displacement plating step, a vanadium chemical conversion treatment step, a drying step, and the like. In addition, two or more steps of the various pre-steps mentioned above may be sequentially carried out in combination as the pre-step. More specifically, before the contact step according to the present invention, a phosphate chemical conversion treatment step may be carried out as a first chemical conversion pretreatment step, followed by a second chemical conversion pretreatment step such as a chromate chemical conversion treatment step, a bismuth displacement plating step, a zirconium chemical conversion treatment step, a titanium chemical conversion treatment step, a hafnium chemical conversion treatment step, a vanadium chemical conversion treatment step, and the like. The zirconium chemical conversion treatment step carried out as the pre-step may be a step of contact with the chemical conversion treatment agent according to the present invention (the composition thereof may be the same as or different from the chemical conversion treatment agent used in the above-mentioned contact step), or may be a step of contact with a chemical conversion treatment agent that is different from the chemical conversion treatment agent according to the present invention. Further, in the case of combining the various pre-steps mentioned above, water rinsing may be optionally carried out after the various pre-steps, or the water rinsing may be partially omitted.

(4) Painting Step

In the surface treatment method according to the present invention, a painting step of bringing a paint composition including a paint into contact with the surface of the formed coating may be carried out after the above-mentioned contact step according to the present invention or after the above-mentioned post-treatment step. The painting method is not particularly limited, and conventionally known methods can be applied, such as roll coating, electrodeposition coating (for example, cationic electrodeposition coating), spray coating, hot spray coating, airless spray coating, electrostatic coating, roller coating, curtain flow coating, brush coating, bar coating, and the like.

Examples of the paint for use in the painting mentioned above include, for example, oil paints, cellulose derivative paints, phenol resin paints, alkyd resin paints, amino alkyd resin paints, urea resin paints, unsaturated resin paints, vinyl resin paints, acrylic resin paints, epoxy resin paints, polyurethane resin paints, silicon resin paints, fluorine resin paints, anticorrosion paints, antifouling paints, powder paints, cationic electrodeposition paints, anionic electrodeposition paints, water-based paints, and the like. In addition, with the use of a composition containing the same paint or various different paints, one painting step, or two or more painting steps may be carried out.

Examples of the method for curing the paint composition mentioned above to form a paint film include, for example, drying methods such as natural drying, reduced-pressure drying, convection-type thermal drying (for example, natural convection-type thermal drying, forced convection-type thermal drying), radiation-type drying (for example, near-infrared drying, far-infrared drying), ultraviolet curing drying, electron beam curing drying, vapor curing, and the like. Moreover, one of the foregoing drying methods may be performed, or two or more thereof may be performed in combination.

The paint film obtained by the painting step may have a single layer or multiple layers. In the case of multiple layers, the paints, the painting methods, the drying method, and the like for the various layers may be respectively the same paint, painting method, drying method, and the like, or different paints, painting methods, drying methods, and the like.

It is to be noted that in the case of applying, as the painting step mentioned above, an electrodeposition painting method with the use of an electrodeposition paint, the sodium ion concentration in the chemical conversion treatment agent for use in the contact step according to the present invention or the post-step, which is a step before the coating step, is preferably controlled to less than 500 mg/kg on a mass basis.

4. Metal Material having Coating and Painted Metal Material (1) Metal Material having Coating The metal material having the coating according to the present invention can be produced in such a way that a chemical conversion coating is formed on the surface of the metal material by bringing the chemical conversion treatment agent according to the present invention into contact with the surface. The chemical conversion coating formed with the chemical conversion treatment agent according to the present invention is typically a chemical conversion coating referred to as a zirconium chemical conversion film, a titanium chemical conversion film, or a hafnium chemical conversion film, in which the metal contained as a main constituent is zirconium, titanium or hafnium, and the film is distinguished from a phosphate chemical conversion treatment film and the like. The mass of the chemical conversion coating formed with the chemical conversion treatment agent according to the present invention is preferably 5 mg/m² or more and 200 mg/m² or less as the amount of zirconium, titanium, or hafnium, and more preferably 10 mg/m² or more and 100 mg/m² or less, but not to be considered limited to this range. In the case of using two or more metals, the total thereof preferably falls within the previously mentioned range. In addition, the thickness of the coating formed preferably falls within the range of 5 to 200 nm.

The amount of zirconium, titanium, or hafnium in the chemical conversion coating formed with the chemical conversion treatment agent according to the present invention can be measured by atomic absorption spectrometry or ICP emission spectrometry after the chemical conversion coating is dissolved in a concentrated nitric acid. Moreover, the amount can measured through the analysis of the metal material having the coating by a fluorescent X ray method.

The metal material having the coating according to the present invention may have one, or two or more of various coatings (for example, a chromate chemical conversion coating, a phosphate chemical conversion coating, a bismuth displacement plating film, and the like) on/over the above-mentioned chemical conversion coating or under/below the above-mentioned chemical conversion coating.

(2) Painted Metal Material

Painted metal material of the present invention can be produced in such a way that a paint film is formed by applying a paint composition containing a paint on/over the surface of the metal material having the coating according to the present invention.

The painted metal material according to the present invention has the paint film containing the paint composition on the surface of the metal material having the coating, that is, on the chemical conversion coating, or on one, or two or more of various coatings (for example, a chromate chemical conversion coating, a phosphate chemical conversion coating, a bismuth displacement plating film, a vanadium chemical conversion coating, and the like), formed on/over the chemical conversion coating. It is to be noted that the paint film can be formed by the painting step with the use of the paint composition mentioned above.

EXAMPLES

The advantageous effect of the present invention will be described in detail with reference to examples, but the present invention is not to be considered limited by the following examples.

<Metal Material>

The following metal materials were prepared (all made by PALTEK CORPORATION).

Cold-rolled steel: SPC (SPCC-SD) 70×150×0.8 mm

Electrogalvanized steel: EG (zinc coating weight 20 g/m²; both sides) 70×150×0.8 mm Hot-dip galvanized steel: GI (zinc coating weight 90 g/m²; both sides) 70×150×0.8 mm <Respective Component Source and Others>

In the present examples, a hexafluorozirconium acid, a hexafluorotitanium acid, a hexafluorohafnium acid, a hydrofluoric acid, an isethionic acid, a methanesulfonic acid or an ethanesulfonic acid, an iron (III) sulfate, an iron (II) sulfate, an aluminum hydroxide, a zinc oxide, and a magnesium hydroxide were respectively used as a zirconium ion source, a titanium ion source, a hafnium ion source, a fluoride on source, an alkanolsulfonic acid, an alkanesulfonic acid, a trivalent iron ion source, a divalent iron ion source, an aluminum source, a zinc source, and a magnesium source. Polyallylamine hydrochloride (PAA-HCl-01; made by Nittobo Medical Co., Ltd.), polyvinyl alcohol (Gohsenol NM-11: Nippon Synthetic Chemical Industry Co., Ltd.), polydiallylamine (PAS 21-HCL; made by Nittobo Medical Co., Ltd.), polyethyleneimine (SP-006; made by Nippon Shokubai Co., Ltd.), or phenol resin (RESITOP PL-4464; made by Gunei Chemical Industry Co., Ltd.) was used as a water-soluble resin and a water-dispersible resin. In addition, as shown in the following tables, in Comparative Example 3, a zirconium sulfate was blended as a zirconium ion source, and in Comparative Examples 5 to 8, instead of the alkanolsulfonic acid or the alkanesulfonic acid, a citric acid, a gluconic acid, a phosphoric acid, and a hydrochloric acid were respectively blended in Comparative Example 5, Comparative Example 6, Comparative Example 7, and Comparative Example 8.

<Preparation of Chemical Conversion Treatment Agent>

With the use of the above-mentioned respective component sources, as shown in Tables 1 to 3, the respective component sources were blended in predetermined amounts, and then adjusted with sodium hydroxide to predetermined pH, thereby preparing chemical conversion treatment agents according to respective examples and respective comparative examples. Tables 1 to 3 show the blending amounts of the respective component sources. In the tables, instead of the hexafluorozirconium acid, a hexafluorotitanium acid and a hexafluorohafnium acid were respectively blended in Examples 38 and 39, and a zirconium sulfate was blended in Comparative Example 3, and thus, the numerical values in the column of "Combined Amount of Hexafluorozirconium Acid" refer to the respective blending amounts of hexafluorotitanium acid in Example 38, of hexafluorohafnium acid in Example 39, and of zirconium sulfate in Comparative Example 3. In addition, in the tables, the "Sulfonic Acid Source" and the "Blending Amount of Sulfonic Acid" refer respectively to the type of the alkanolsulfonic acid or alkanesulfonic acid blended and the blending amount thereof for Examples 1 to 44 and Comparative Examples 1 to 3 and 9, and respectively to the type of an acid used instead of the alkanesulfonic acid and the alkanolsulfonic acid (citric acid in Comparative Example 5, gluconic acid in Comparative Example 6, and phosphoric acid in Comparative Example 7, and hydrochloric acid in Comparative Example 8) and the blending amount thereof for Comparative Examples 5 to 8.

<Measurement of Trivalent Iron Concentration and Divalent Iron Concentration>

As described previously, iron (III) sulfate was used as a trivalent iron component source blended in the chemical conversion treatment agent, and iron (II) sulfate was used as a divalent iron component source blended therein. There is, however, a possibility that the trivalent iron concentration and the divalent iron concentration will be changed due to the equilibrium reaction in the chemical conversion treatment agent, and thus, the trivalent iron concentration and the divalent iron concentration were measured with the use of the following method.

The trivalent iron concentration and the divalent iron concentration can be measured by a chelate titration method. EDTA, which is used as a chelating titrant, forms a chelate with trivalent iron, but forms almost no chelate with divalent iron in the region of pH 1.0 to 2.0. The titanium, zirconium, or hafnium blended in the chemical conversion treatment agent, however, forms a chelate with EDTA in the pH range of 1.0 to 2.0, and thus can be an element which interferes with the measurement of the trivalent iron concentration. Therefore, chelate titration before and after iron reduction was carried out with the use of an ascorbic acid as a reducing agent, thereby accurately measuring the trivalent iron concentration. As described previously, in the range of pH 1.0 to 2.0, EDTA forms almost no chelate with divalent iron. In addition, ascorbic acid reduces trivalent iron to divalent iron, but does not affect titanium, zirconium, or hafnium. Therefore, the chelate titration result before iron reduction is obtained as a result derived from the trivalent iron, and titanium, zirconium, or hafnium, and the chelate titration result after iron reduction is obtained as a result derived from titanium, zirconium, or hafnium. Accordingly, it is possible to measure the trivalent iron concentration by determining the difference between the chelate titration results before and after iron reduction. In addition, the divalent iron concentration was measured by determining the total iron concentration from the blended raw materials, and subtracting the trivalent iron concentration from the total iron concentration.

<Chelate Titration before Iron Reduction>

Distilled water was added to 1 g of the chemical conversion treatment agents according to the respective examples and the respective comparative examples for the total amount of 100 g. To 10 g of this solution, 0.2 mol/kg HCl was added so as to reach pH of 1.5. This solution with 0.2 g of 0.2 mol/kg xinol orange added thereto was subjected to chelate titration with the use of a 0.1 mmol/kg EDTA aqueous solution. The liquid amount of the 0.1 mmol/kg EDTA aqueous solution required for the titration was denoted by A (g).

<Chelate Titration after Iron Reduction>

Distilled water was added to 1 g of the chemical conversion treatment agents according to the respective examples and the respective comparative examples for the total amount of 100 g. To 10 g of this solution, 1.0 g of ascorbic acid was added, and 0.2 mol/kg HCl was added so as to reach pH of 1.5. This solution with 0.2 g of 0.2 mol/kg xinol orange added thereto was subjected to chelate titration with the use of a 0.1 mmol/kg EDTA aqueous solution. The liquid amount of the 0.1 mmol/kg EDTA aqueous solution required for the titration was denoted by B (g).

<Calculation of Trivalent Iron Concentration and Divalent Iron Concentration>

From the values of A and B measured h the previously described chelate titration, the trivalent iron concentration was calculated with the use of the following (formula 1), and the divalent iron concentration was calculated with the use of (formula 2). In addition, $Fe^{2+}/Fe^{3+}$ was calculated with the use of (Formula 3).

$$\text{Trivalent Iron Concentration} = (A-B) \times 55.85 \quad \text{(Formula 1)}$$

$$\text{Divalent Iron Concentration} = \text{Total Iron Concentration} - \text{Trivalent Iron Concentration} \quad \text{(Formula 21)}$$

$$Fe^{2+}/Fe^{3+} = \text{Divalent Iron Concentration}/\text{Trivalent Iron Concentration} \quad \text{(Formula 3)}$$

TABLE 1

|  | Blending Amount of Hexafluorozirconium Acid mg/kg | Blending Amount of Hydrofluoric Acid mg/kg | Sulfonic Acid Source | Blending Amount of Sulfonic Acid mg/kg | Blending Amount of Iron (II) Sulfate mg/kg | Blending Amount of Iron (III) Sulfate mg/kg | $Fe^{2+}/Fe^{3+}$ |
|---|---|---|---|---|---|---|---|
| Example 1 | 10 | 230 | Isethionic Acid | 7500 | 0 | 1790 | 0.00 |
| Example 2 | 45 | 230 | Isethionic Acid | 7500 | 0 | 1790 | 0.00 |
| Example 3 | 110 | 230 | Isethionic Acid | 7500 | 0 | 1790 | 0.00 |
| Example 4 | 225 | 230 | Isethionic Acid | 7500 | 0 | 1790 | 0.00 |
| Example 5 | 1800 | 230 | Isethionic Acid | 7500 | 0 | 1790 | 0.00 |
| Example 6 | 225 | 230 | Isethionic Acid | 7500 | 0 | 18 | 0.00 |
| Example 7 | 225 | 230 | Isethionic Acid | 7500 | 0 | 72 | 0.00 |
| Example 8 | 225 | 230 | Isethionic Acid | 7500 | 0 | 179 | 0.00 |
| Example 9 | 225 | 230 | Isethionic Acid | 11000 | 0 | 3580 | 0.00 |
| Example 10 | 225 | 230 | Isethionic Acid | 7500 | 27 | 1790 | 0.02 |
| Example 11 | 225 | 230 | Isethionic Acid | 9000 | 272 | 1790 | 0.20 |
| Example 12 | 225 | 230 | Isethionic Acid | 10000 | 408 | 1790 | 0.30 |

TABLE 1-continued

| | | | | | | | |
|---|---|---|---|---|---|---|---|
| Example 13 | 225 | 230 | Isethionic Acid | 10000 | 612 | 1790 | 0.45 |
| Example 14 | 225 | 230 | Isethionic Acid | 10000 | 816 | 1790 | 0.60 |
| Example 15 | 225 | 230 | Isethionic Acid | 12000 | 1632 | 1790 | 1.20 |
| Example 16 | 225 | 230 | Isethionic Acid | 15000 | 2176 | 1790 | 1.60 |
| Example 17 | 225 | 230 | Isethionic Acid | 500 | 0 | 179 | 0.00 |
| Example 18 | 225 | 230 | Isethionic Acid | 3000 | 0 | 540 | 0.00 |
| Example 19 | 225 | 230 | Isethionic Acid | 10000 | 0 | 1790 | 0.00 |
| Example 20 | 225 | 230 | Isethionic Acid | 20000 | 0 | 1790 | 0.00 |

| | Blending Amount of Aluminum Hydroxide mg/kg | Blending Amount of Zinc Oxide mg/kg | Blending Amount of Magnesium Hydroxide mg/kg | Water-soluble and Water-dispersible Resin — | Blending Amount of Resin mg/kg | Treatment pH — |
|---|---|---|---|---|---|---|
| Example 1 | 290 | 1245 | 0 | Allylamine Polymer | 100 | 4.00 |
| Example 2 | 290 | 1245 | 0 | Allylamine Polymer | 100 | 4.00 |
| Example 3 | 290 | 1245 | 0 | Allylamine Polymer | 100 | 4.00 |
| Example 4 | 290 | 1245 | 0 | Allylamine Polymer | 100 | 4.00 |
| Example 5 | 280 | 1245 | 0 | Allylamine Polymer | 100 | 4.00 |
| Example 6 | 290 | 1245 | 0 | Allylamine Polymer | 100 | 4.00 |
| Example 7 | 290 | 1245 | 0 | Allylamine Polymer | 100 | 4.00 |
| Example 8 | 290 | 1245 | 0 | Allylamine Polymer | 100 | 4.00 |
| Example 9 | 290 | 1245 | 0 | Allylamine Polymer | 100 | 4.00 |
| Example 10 | 290 | 1245 | 0 | Allylamine Polymer | 100 | 4.00 |
| Example 11 | 280 | 1245 | 0 | Allylamine Polymer | 100 | 4.00 |
| Example 13 | 290 | 1245 | 0 | Allylamine Polymer | 100 | 4.00 |
| Example 13 | 290 | 1245 | 0 | Allylamine Polymer | 100 | 4.00 |
| Example 14 | 290 | 1245 | 0 | Allylamine Polymer | 100 | 3.30 |
| Example 15 | 290 | 1245 | 0 | Allylamine Polymer | 100 | 3.30 |
| Example 16 | 290 | 1245 | 0 | Allylamine Polymer | 100 | 3.30 |
| Example 17 | 290 | 25 | 0 | Allylamine Polymer | 100 | 4.00 |
| Example 18 | 290 | 370 | 0 | Allylamine Polymer | 100 | 4.00 |
| Example 19 | 290 | 1245 | 0 | Allylamine Polymer | 100 | 4.00 |
| Example 20 | 290 | 1245 | 0 | Allylamine Polymer | 100 | 4.00 |

TABLE 2

| | Blending Amount of Hexafluoro-zirconium Acid mg/kg | Blending Amount of Hydrofluoric Acid mg/kg | Sulfonic Acid Source — | Blending Amount of Sulfonic Acid mg/kg | Blending Amount of Iron (II) Sulfate mg/kg | Blending Amount of Iron (III) Sulfate mg/kg | $Fe^{2+}/Fe^{3+}$ — |
|---|---|---|---|---|---|---|---|
| Example 21 | 225 | 230 | Isethionic Acid | 7500 | 0 | 1790 | 0.00 |
| Example 22 | 225 | 230 | Isethionic Acid | 7500 | 0 | 1790 | 0.00 |
| Example 23 | 225 | 230 | Isethionic Acid | 7500 | 0 | 1790 | 0.00 |
| Example 24 | 225 | 230 | Isethionic Acid | 7500 | 0 | 1790 | 0.00 |
| Example 25 | 225 | 230 | Isethionic Acid | 7500 | 0 | 1790 | 0.00 |
| Example 26 | 225 | 230 | Isethionic Acid | 7500 | 0 | 1790 | 0.00 |
| Example 27 | 225 | 230 | Isethionic Acid | 7500 | 0 | 1790 | 0.00 |
| Example 28 | 225 | 230 | Isethionic Acid | 40000 | 0 | 1790 | 0.00 |
| Example 29 | 225 | 230 | Isethionic Acid | 40000 | 0 | 1790 | 0.00 |
| Example 30 | 225 | 230 | Isethionic Acid | 7500 | 0 | 1790 | 0.00 |
| Example 31 | 225 | 230 | Isethionic Acid | 7500 | 0 | 1790 | 0.00 |
| Example 32 | 225 | 230 | Isethionic Acid | 7500 | 0 | 1790 | 0.00 |
| Example 33 | 225 | 230 | Isethionic Acid | 7500 | 0 | 1790 | 0.00 |
| Example 34 | 225 | 230 | Isethionic Acid | 7500 | 0 | 1790 | 0.00 |
| Example 35 | 225 | 230 | Isethionic Acid | 7500 | 0 | 1790 | 0.00 |
| Example 36 | 225 | 230 | Methanesulfonic Acid | 7500 | 0 | 1790 | 0.00 |
| Example 37 | 225 | 230 | Ethanesulfonic Acid | 7500 | 0 | 1790 | 0.00 |
| Example 38 | As Hexafluoro-titanium Acid 225 | 230 | Isethionic Acid | 7500 | 0 | 1790 | 0.00 |
| Example 39 | As Hexafluoro-hafnium Acid 225 | 230 | Isethionic Acid | 7500 | 0 | 1790 | 0.00 |
| Example 40 | 225 | 230 | Isethionic Acid | 7500 | 0 | 1790 | 0.00 |
| Example 41 | 225 | 230 | Isethionic Acid | 7500 | 0 | 1790 | 0.00 |
| Example 42 | 225 | 230 | Isethionic Acid | 7500 | 0 | 1790 | 0.00 |
| Example 43 | 225 | 230 | Isethionic Acid | 7500 | 0 | 1790 | 0.00 |
| Example 44 | 225 | 230 | Isethionic Acid | 7500 | 0 | 1790 | 0.00 |

TABLE 2-continued

|  | Blending Amount of Aluminum Hydroxide mg/kg | Blending Amount of Zinc Oxide mg/kg | Blending Amount of Magnesium Hydroxide mg/kg | Water-soluble and Water-dispersible Resin — | Blending Amount of Resin mg/kg | Treatment pH — |
|---|---|---|---|---|---|---|
| Example 21 | 0 | 0 | 0 | — | 0 | 4.00 |
| Example 22 | 290 | 0 | 0 | — | 0 | 4.00 |
| Example 23 | 0 | 1245 | 0 | — | 0 | 4.00 |
| Example 24 | 0 | 0 | 0 | Allyamine Polymer | 100 | 4.00 |
| Example 25 | 290 | 1245 | 0 | — | 0 | 4.00 |
| Example 26 | 290 | 0 | 0 | Allyamine Polymer | 100 | 4.00 |
| Example 27 | 0 | 1245 | 0 | Allyamine Polymer | 100 | 4.00 |
| Example 28 | 0 | 0 | 6000 | — | 0 | 4.00 |
| Example 29 | 290 | 1245 | 6000 | Allyamine Polymer | 100 | 4.00 |
| Example 30 | 290 | 1245 | 0 | Allyamine Polymer | 20 | 4.00 |
| Example 31 | 290 | 1245 | 0 | Allyamine Polymer | 300 | 4.00 |
| Example 32 | 290 | 1245 | 0 | Polyvinyl Alcohol | 100 | 4.00 |
| Example 33 | 290 | 1245 | 0 | Polyethyleneimine | 100 | 4.00 |
| Example 34 | 290 | 1245 | 0 | Polydiallylamine | 100 | 4.00 |
| Example 35 | 290 | 1245 | 0 | Phenol Resin | 100 | 4.00 |
| Example 36 | 290 | 1245 | 0 | Allylamine Polymer | 100 | 4.00 |
| Example 37 | 290 | 1245 | 0 | Allylamine Polymer | 100 | 4.00 |
| Example 38 | 290 | 1245 | 0 | Allylamine Polymer | 100 | 4.00 |
| Example 39 | 290 | 1245 | 0 | Allylamine Polymer | 100 | 4.00 |
| Example 40 | 290 | 1245 | 0 | Allylamine Polymer | 100 | 1.20 |
| Example 41 | 290 | 1245 | 0 | Allylamine Polymer | 100 | 2.90 |
| Example 42 | 290 | 1245 | 0 | Allylamlne Polymer | 100 | 3.50 |
| Example 43 | 290 | 1245 | 0 | Allylamine Polymer | 100 | 5.10 |
| Example 44 | 290 | 1245 | 0 | Allylamine Polymer | 100 | 6.70 |

TABLE 3

|  | Blending Amount of Hexafluoro-zirconium Acid mg/kg | Blending Amount of Hydrofluoric Acid mg/kg | Sulfonic Acid Source — | Blending Amount of Sulfonic Acid mg/kg | Blending Amount of Iron (II) Sulfate mg/kg | Blending Amount of Iron (III) Sulfate mg/kg | $Fe^{2+}/Fe^{3+}$ — |
|---|---|---|---|---|---|---|---|
| Comparative Example 1 | 225 | 230 | Isethionic Acid | 7500 | 0 | 0 | — |
| Comparative Example 2 | 0 | 230 | Isethionic Acid | 7500 | 0 | 1790 | 0.00 |
| Comparative Example 3 | As Zirconium Sulfate 225 | 0 | Isethionic Acid | 7500 | 0 | 1790 | 0.00 |
| Comparative Example 4 | 225 | 230 | — | 0 | 0 | 1790 | 0.00 |
| Comparative Example 5 | 225 | 230 | Citric Acid | 7500 | 0 | 1790 | 0.00 |
| Comparative Example 6 | 225 | 230 | Gluconic Acid | 7500 | 0 | 1790 | 0.00 |
| Comparative Example 7 | 225 | 230 | Phosphoric Acid | 7500 | 0 | 1790 | 0.00 |
| Comparative Example 8 | 225 | 230 | Hydrochloric Acid | 7500 | 0 | 1790 | 0.00 |
| Comparative Example 9 | 225 | 230 | Isethionic Acid | 7500 | 1360 | 0 | — |

|  | Blending Amount of Aluminum Hydroxide mg/kg | Blending Amount of Zinc Oxide mg/kg | Blending Amount of Magnesium Hydroxide mg/kg | Water-soluble and Water-dispersible Resin — | Blending Amount of Resin mg/kg | Treatment pH — |
|---|---|---|---|---|---|---|
| Comparative Example 1 | 290 | 1245 | 0 | Allylamine Polymer | 100 | 4.00 |
| Comparative Example 2 | 290 | 1245 | 0 | Allylamine Polymer | 100 | 4.00 |
| Comparative Example 3 | 0 | 1245 | 0 | Allylamine Polymer | 100 | 4.00 |
| Comparative Example 4 | 290 | 1245 | 0 | Allylamine Polymer | 100 | 3.30 |
| Comparative Example 5 | 290 | 1245 | 0 | Allylamine Polymer | 100 | 4.00 |
| Comparative Example 6 | 290 | 1245 | 0 | Allylamine Polymer | 100 | 4.00 |

TABLE 3-continued

|  | | | | | | |
|---|---|---|---|---|---|---|
| Comparative Example 7 | 290 | 1245 | 0 | Allylamine Polymer | 100 | 4.00 |
| Comparative Example 8 | 290 | 1245 | 0 | Allylamine Polymer | 100 | 4.00 |
| Comparative Example 9 | 290 | 1245 | 0 | Allylamine Polymer | 100 | 3.30 |

<Production of Metal Material having Chemical Conversion Coating>

Rust-proofing oil was removed by spraying a degreasing agent (FC-E 2001, made by Nihon Parkerizing Co., Ltd.) onto the surfaces of various metal materials (SPC, EG, or GI) at 43° C. for 120 seconds. Thereafter, water rinsing was carried out by spraying for 30 seconds. Subsequently, the respective metal materials were immersed in the chemical conversion treatment agents according to the respective examples and the respective comparative examples at 38° C. for 120 seconds to form chemical conversion coatings on the entire surfaces of the respective metal materials. The obtained metal materials with the chemical conversion coatings was rinsed with tap water and deionized water in this order, and dried at 40° C.

<Measurement of Zirconium Deposition Amount>

The deposition amount of zirconium, titanium, or hafnium in the various chemical conversion coatings formed on the surfaces of the various metal materials was determined by the above-mentioned method with the use of fluorescent X-rays (wavelength dispersive X-ray fluorescence analyzer made by Rigaku Corporation: ZSX Primus II), <Cation Electrodeposition Painting>

With the respective metal materials with the various chemical conversion coatings, produced by the method mentioned above, as a cathode, paint films were obtained by cathode electrolysis with the use of an electrodeposition paint (GT-100V made by Kansai Paint Co., Ltd.). It is to be noted that the cathode electrolysis was carried out at an applied voltage of 180 V and a paint temperature of 30.0±0.5° C. In addition, the quantity of electricity was adjusted to carry out the cathode electrolysis such that the paint film thickness was 15.0±1.0 μm. After the electrodeposition mentioned above, the surfaces of the paint films were rinsed with deionized water, and baked at 170° C. for 26 minutes to prepare the respective metal materials (respective test pieces) with the paint films.

<Corrosion Resistance Test 1 (Combined Cycle Test)>

Each test plate was cross-cut with a cutter, placed in a combined cycle testing machine, and subjected to 60 cycles of combined cycle test in accordance with the JASO-M609-91. The maximum both side blister width from the cross cut after the 60 cycles was measured, and evaluated in accordance with the evaluation criteria shown below. It is to be noted that, in the following evaluation criteria, three or more points are levels which have no problem in practical use.

<Evaluation Criteria>

6: maximum both side blister width of less than 3 mm
5: maximum both side blister width of 3 mm or more and less than 4 mm
4: maximum both side blister width of 4 nun or more and less than 8 mm
3: maximum both side blister width of 8mm or more and less than 12 mm
2: maximum both side blister width of 12 mm or more and less than 16 mm
1: maximum both side blister width of 16 mm or more <Corrosion Resistance Test 2 (Cathode Corrosion Test)>

Each test plate was cut with a cutter, and subjected to cathode electrolysis for 8 hours in a 0.1 mol/L sodium sulfate aqueous solution, thereby carrying out a cathode corrosion test. It is to be noted that the cathode electrolysis was carried out at a constant current electrolysis of 10 mA and a liquid temperature of 40.0±0.5° C. The cut part subjected to the cathode electrolysis was peeled off with a tape, and the maximum both side peeling width from the cut part was measured, and evaluated in accordance with the evaluation criteria shown below. It is to be noted that, in the following evaluation criteria, three or more points are levels Which have no problem in <Evaluation Criteria>

6: maximum both side peeling width of less than 2 mm
5: maximum both side peeling width of 2 mm or more and less than 3 mm
4: maximum both side peeling width of 3 mm or more and less than 6 mm
3: maximum both side peeling width of 6 nun or more and less than 9 mm
2: maximum both side peeling width of 9 mm or more and less than 12 mm
1: maximum both side peeling width of 12 mm or more

TABLE 4

| | SPC Material | | | | EG Material | | | | GI Material | | |
|---|---|---|---|---|---|---|---|---|---|---|---|
| | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — |
| Example 1 | 1 | 6.7 | 4 | 4 | 54 | 11.8 | 4 | 5 | 107 | 9.6 | 5 | 4 |
| Example 2 | 2 | 15.8 | 5 | 5 | 55 | 24.2 | 5 | 6 | 108 | 21.5 | 6 | 5 |
| Example 3 | 3 | 25.9 | 6 | 6 | 56 | 45.3 | 6 | 6 | 109 | 36.4 | 6 | 6 |
| Example 4 | 4 | 38.4 | 6 | 6 | 57 | 60.5 | 6 | 6 | 110 | 56.0 | 6 | 6 |
| Example 5 | 5 | 62.7 | 6 | 6 | 58 | 98.3 | 6 | 6 | 111 | 91.3 | 6 | 6 |
| Example 6 | 6 | 39.5 | 5 | 5 | 59 | 65.1 | 4 | 5 | 112 | 58.6 | 5 | 4 |
| Example 7 | 7 | 40.7 | 5 | 5 | 60 | 71.9 | 5 | 6 | 113 | 54.1 | 5 | 5 |
| Example 8 | 8 | 38.3 | 6 | 6 | 61 | 68.1 | 6 | 6 | 114 | 50.0 | 5 | 6 |
| Example 9 | 9 | 37.9 | 6 | 6 | 62 | 59.7 | 6 | 6 | 115 | 53.7 | 6 | 6 |
| Example 10 | 10 | 39.1 | 6 | 6 | 63 | 64.0 | 6 | 6 | 116 | 56.6 | 6 | 6 |

TABLE 4-continued

| | SPC Material | | | | EG Material | | | | GI Material | | |
|---|---|---|---|---|---|---|---|---|---|---|---|
| | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — |
| Example 11 | 11 | 38.6 | 6 | 6 | 64 | 68.4 | 6 | 6 | 117 | 52.0 | 6 | 6 |
| Example 12 | 12 | 34.5 | 5 | 5 | 65 | 52.4 | 5 | 5 | 118 | 48.5 | 5 | 5 |
| Example 13 | 13 | 33.2 | 5 | 5 | 66 | 50.0 | 4 | 4 | 119 | 49.5 | 4 | 4 |
| Example 14 | 14 | 30.5 | 4 | 4 | 67 | 52.4 | 3 | 4 | 120 | 44.4 | 3 | 4 |
| Example 15 | 15 | 26.5 | 4 | 4 | 68 | 44.2 | 3 | 3 | 121 | 38.9 | 3 | 3 |
| Example 16 | 16 | 22.8 | 3 | 3 | 69 | 35.8 | 3 | 3 | 122 | 32.4 | 3 | 3 |
| Example 17 | 17 | 30.7 | 6 | 6 | 70 | 48.4 | 5 | 6 | 123 | 45.8 | 6 | 6 |
| Example 18 | 18 | 38.2 | 6 | 6 | 71 | 66.6 | 6 | 6 | 124 | 49.8 | 6 | 6 |
| Example 19 | 19 | 40.7 | 6 | 6 | 72 | 65.6 | 6 | 6 | 125 | 57.6 | 6 | 6 |
| Example 20 | 20 | 39.6 | 6 | 6 | 73 | 66.7 | 6 | 6 | 126 | 51.6 | 6 | 6 |

TABLE 5

| | SPC Material | | | | EG Material | | | | GI Material | | |
|---|---|---|---|---|---|---|---|---|---|---|---|
| | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — |
| Example 21 | 21 | 23.5 | 4 | 4 | 74 | 38.4 | 4 | 4 | 127 | 33.1 | 4 | 4 |
| Example 22 | 22 | 34.7 | 5 | 5 | 75 | 57.7 | 5 | 5 | 128 | 47.8 | 5 | 5 |
| Example 23 | 23 | 28.7 | 5 | 4 | 76 | 44.9 | 4 | 4 | 129 | 41.8 | 4 | 4 |
| Example 24 | 24 | 29.4 | 5 | 5 | 77 | 48.5 | 4 | 5 | 130 | 41.4 | 5 | 4 |
| Example 25 | 25 | 38.1 | 5 | 5 | 78 | 65.3 | 5 | 5 | 131 | 51.4 | 5 | 5 |
| Example 26 | 26 | 41.1 | 6 | 6 | 79 | 71.1 | 6 | 5 | 132 | 56.2 | 6 | 5 |
| Example 27 | 27 | 30.6 | 4 | 4 | 80 | 50.8 | 5 | 5 | 133 | 39.8 | 5 | 5 |
| Example 28 | 28 | 33.4 | 5 | 5 | 81 | 57.4 | 5 | 5 | 134 | 50.0 | 5 | 5 |
| Example 29 | 29 | 45.4 | 6 | 6 | 82 | 77.5 | 6 | 6 | 135 | 67.9 | 6 | 6 |
| Example 30 | 30 | 38.0 | 6 | 6 | 83 | 59.4 | 6 | 6 | 136 | 50.7 | 6 | 6 |
| Example 31 | 31 | 33.3 | 6 | 6 | 84 | 58.2 | 6 | 6 | 137 | 49.2 | 6 | 6 |
| Example 32 | 32 | 36.5 | 5 | 5 | 85 | 64.5 | 5 | 5 | 138 | 51.1 | 5 | 5 |
| Example 33 | 33 | 30.5 | 5 | 5 | 86 | 50.3 | 5 | 5 | 139 | 39.8 | 5 | 5 |
| Example 34 | 34 | 36.6 | 6 | 6 | 87 | 57.0 | 6 | 6 | 140 | 51.4 | 6 | 6 |
| Example 35 | 35 | 45.8 | 6 | 6 | 88 | 70.6 | 6 | 6 | 141 | 61.9 | 6 | 6 |
| Example 36 | 36 | 37.3 | 6 | 6 | 89 | 66.9 | 6 | 6 | 142 | 50.0 | 6 | 6 |
| Example 37 | 37 | 39.8 | 6 | 6 | 90 | 67.0 | 6 | 6 | 143 | 52.8 | 6 | 6 |
| Example 38 | 38 | As Ti 27.8 | 5 | 6 | 91 | As Ti 35.8 | 6 | 6 | 144 | As Ti 32.5 | 6 | 6 |
| Example 39 | 39 | As Hf 55.7 | 5 | 6 | 92 | As Hf 74.8 | 6 | 6 | 145 | As Hf 63.9 | 6 | 6 |
| Example 40 | 40 | 5.1 | 3 | 3 | 93 | 8.4 | 3 | 3 | 146 | 7.3 | 3 | 3 |
| Example 41 | 41 | 12.7 | 5 | 5 | 94 | 22.0 | 5 | 5 | 147 | 18.7 | 5 | 5 |
| Example 42 | 42 | 28.3 | 6 | 6 | 95 | 47.7 | 6 | 6 | 148 | 40.6 | 6 | 6 |
| Example 43 | 43 | 24.5 | 6 | 6 | 96 | 40.8 | 6 | 6 | 149 | 32.2 | 6 | 6 |
| Example 44 | 44 | 5.7 | 3 | 3 | 97 | 9.0 | 3 | 3 | 150 | 7.8 | 3 | 3 |

TABLE 6

| | SPC Material | | | | EG Material | | | | GI Material | | |
|---|---|---|---|---|---|---|---|---|---|---|---|
| | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — |
| Comparative Example 1 | 45 | 34.6 | 3 | 3 | 98 | 54.3 | 1 | 1 | 151 | 47.0 | 2 | 2 |
| Comparative Example 2 | 46 | 0.0 | 1 | 1 | 99 | 0.0 | 2 | 1 | 152 | 0.0 | 2 | 1 |
| Comparative Example 3 | 47 | 0.0 | 1 | 1 | 100 | 0.0 | 1 | 3 | 153 | 0.0 | 1 | 3 |
| Comparative Example 4 | 48 | 21.8 | 3 | 3 | 101 | 38.8 | 4 | 1 | 154 | 31.2 | 4 | 1 |

TABLE 6-continued

| | SPC Material | | | | EG Material | | | | GI Material | | |
|---|---|---|---|---|---|---|---|---|---|---|---|
| | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — | Test Piece — | Zr Deposition Amount mg/m² | Combined Cycle Test — | Cathode Corrosion Test — |
| Comparative Example 5 | 49 | 1.6 | 1 | 1 | 102 | 2.7 | 1 | 1 | 155 | 2.3 | 1 | 1 |
| Comparative Example 6 | 50 | 2.3 | 1 | 1 | 103 | 3.5 | 1 | 1 | 156 | 3.2 | 1 | 1 |
| Comparative Example 7 | 51 | 0.7 | 1 | 1 | 104 | 1.1 | 1 | 1 | 157 | 1.0 | 1 | 1 |
| Comparative Example 8 | 52 | 16.8 | 2 | 2 | 105 | 27.9 | 2 | 2 | 158 | 23.8 | 2 | 2 |
| Comparative Example 9 | 53 | 34.1 | 3 | 2 | 106 | 53.7 | 3 | 2 | 159 | 49.6 | 3 | 2 |

INDUSTRIAL APPLICABILITY

The chemical conversion treatment agent according to the present invention and the method for producing a chemical conversion coating with the use of the agent are capable of forming, on/over the surface of a metal material, a chemical conversion coating which has various superior performances. The metal material having the chemical conversion coating is useful for various uses, such as building materials, electrical appliances, vehicles, and the like.

The invention claimed is:

1. A chemical conversion treatment agent for a metal material, for forming a coating on/over a surface of the metal material, the chemical conversion treatment agent comprising:
   an ion containing at least one metal selected from the group consisting of titanium, zirconium and hafnium;
   a fluorine ion;
   at least one selected from the group consisting of an alkanesulfonic acid, an alkanolsulfonic acid, and ions thereof;
   an ion containing trivalent iron, and
   a blending amount of a component source of the ion containing trivalent iron falls within the range of 5 mg/kg or more and 2000 mg/kg or less in iron equivalent mass.

2. The chemical conversion treatment agent according to claim 1, comprising an ion containing at least one metal selected from the group consisting of aluminum, magnesium, and zinc.

3. The chemical conversion treatment agent according to claim 2, comprising at least one selected from the group consisting of water-soluble resins and water-dispersible resins.

4. The chemical conversion treatment agent according to claim 1, comprising at least one selected from the group consisting of water-soluble resins and water-dispersible resins.

5. A method for producing a chemical conversion coating on/over a surface of a metal material, the method comprising bringing the chemical conversion treatment agent according to claim 1 into contact with the surface.

6. The method according to claim 5, further comprising carrying out a painting on/over the surface which was subjected to contact with the chemical conversion treatment agent.

* * * * *